United States Patent [19]

Dammert et al.

[11] Patent Number: 6,005,055
[45] Date of Patent: *Dec. 21, 1999

[54] POLYETHYLENE COMPATIBLE SULPHONIC ACIDS AS SILANE CROSSLINKING CATALYSTS

[75] Inventors: Ruth Dammert, Helsinki, Finland; Bill Gustafsson, Stenungsund, Sweden; Bernt-Åke Sultan, Borga, Finland

[73] Assignee: Borealis Holding A/S, Lyngby, Denmark

[*] Notice: This patent issued on a continued prosecution application filed under 37 CFR 1.53(d), and is subject to the twenty year patent term provisions of 35 U.S.C. 154(a)(2).

[21] Appl. No.: 08/666,427
[22] PCT Filed: Nov. 3, 1994
[86] PCT No.: PCT/SE94/01028
   § 371 Date: Jul. 30, 1996
   § 102(e) Date: Jul. 30, 1996
[87] PCT Pub. No.: WO95/17463
   PCT Pub. Date: Jun. 29, 1995

[30] Foreign Application Priority Data

Dec. 20, 1993 [SE] Sweden .................. 9304202

[51] Int. Cl.$^6$ ........................................ C08J 3/24
[52] U.S. Cl. ........................................ 525/326.5
[58] Field of Search ................. 525/326.5, 353

[56] References Cited

U.S. PATENT DOCUMENTS

| | | |
|---|---|---|
| 3,646,155 | 2/1972 | Scott . |
| 4,117,195 | 9/1978 | Swarbrick et al. . |
| 4,297,310 | 10/1981 | Akutsu et al. . |
| 4,351,876 | 9/1982 | Doi et al. . |
| 4,397,981 | 8/1983 | Doi et al. . |
| 4,413,066 | 11/1983 | Isaka et al. . |
| 4,446,283 | 5/1984 | Doi et al. . |
| 4,456,704 | 6/1984 | Fukumura et al. . |
| 5,393,823 | 2/1995 | Konno ...................... 524/507 |
| 5,639,825 | 6/1997 | Nanbu ...................... 525/100 |

FOREIGN PATENT DOCUMENTS

| | | |
|---|---|---|
| 0 207 627 | 1/1987 | European Pat. Off. . |
| 0 193 317 | 9/1990 | European Pat. Off. . |
| 0 475 064 | 3/1992 | European Pat. Off. . |
| 0475064 | 3/1992 | European Pat. Off. . |
| 0497530 | 8/1992 | European Pat. Off. . |
| 2 028 831 | 3/1980 | United Kingdom . |
| WO 91/09075 | 6/1991 | WIPO . |

Primary Examiner—Christopher Henderson
Attorney, Agent, or Firm—Merchant & Gould P.C.

[57] ABSTRACT

A crosslinkable polymer composition contains a crosslinkable polymer with hydrolysable silane groups and at least one silanol condensation catalyst. The polymer composition is distinguished by the silanol condensation catalyst being a compound of the formula $ArSO_3H$ (I) or a precursor thereof, Ar being a substituted benzene or naphthalene ring, the substituent or substituents containing 4–20 carbon atoms, preferably 10–18 carbon atoms. The precursor may be an anhydride of the sulphonic acid of formula (I), or a sulphonic acid of formula (I) provided with a hydrolysable protective group, eg. an acetyl group. Specific examples of compounds of formula (I) are dodecyl benzene sulphonic acid and tetrapropyl benzene sulphonic acid.

10 Claims, No Drawings

POLYETHYLENE COMPATIBLE SULPHONIC ACIDS AS SILANE CROSSLINKING CATALYSTS

BACKGROUND OF THE INVENTION

1. Field of the Invention

The present invention relates to a crosslinkable polymer composition containing a crosslinkable polymer with hydrolysable silane groups and at least one silanol condensation catalyst.

2. Description of Related Art

It is known to crosslink different polymers by means of additives. Crosslinking improves such properties of the polymer as its mechanical strength and heat resistance. Polymers normally considered to be thermoplastics, and not crosslinkable, can also be crosslinked by introducing crosslinkable groups in the polymer. An example thereof is the crosslinking of polyolefins, such as polyethylene. A silane compound can be introduced as a crosslinkable group, e.g. by grafting the silane compound onto the prepared polyolefin, or by copolymerisation of the olefin and the silane compound. This technique is previously known, and further details may be obtained from U.S. Pat. Nos. 4,413,066; 4,297,310; 4,351,876; 4,397,981; 4,446,283; and 4,456,704, all of which are incorporated herein by reference.

The crosslinking of polymers with hydrolysable silane groups is carried out by so-called moisture curing. In a first step, the silane groups are hydrolysed under the influence of water, resulting in the splitting-off of alcohol and the formation of silanol groups. In a second step, the silanol groups are crosslinked by a condensation reaction splitting off water. In both steps, a so-called silanol condensation catalyst is used as catalyst.

Prior-art silanol condensation catalysts include carboxylates of metals, such as tin, zinc, iron, lead and cobalt; organic bases; inorganic acids; and organic acids.

Mention should here especially be made of dibutyl tin dilaurate (DBTDL), dibutyl tin diacetate, dioctyl tin dilaurate, stannous acetate, stannous caprylate, lead naphthenate, zinc caprylate, cobalt naphthenate, ethyl amines, dibutyl amine, hexylamines, pyridine, inorganic acids, such as sulphuric acid and hydrochloric acid, as well as organic acids, such as toluene sulphonic acid, acetic acid, stearic acid and maleic acid. Especially the tin carboxylates are much used as catalysts.

EP 0 475 064 further teaches the crosslinking of silane-containing polymer compositions with hydrolysable groups by means of a zeolite that has been modified by being reacted with at least one carboxylic acid and/or sulphonic acid at a temperature of at least 150° C. Examples of sulphonic acids are toluene sulphonic acid and alpha- and beta-naphthalene sulphonic acid. The crosslink is said to be of essentially non-hydrolytic type.

WO 91/09075 further discloses the use of a blocked acid, such as an acid anhydride, e.g. stearic acid anhydride or benzoic acid anhydride, as silanol condensation catalyst. Such catalysts counteract undesirable premature crosslinking, commonly referred to as scorching or precuring, of the polymer composition.

GB 2,028,831 and EP 0,193,317 may be mentioned as examples of the prior art relating to the crosslinking of polymers containing hydrolysable silane groups by means of the above-mentioned silanol condensation catalysts. EP 0,207,627 also discloses the use of a special silanol condensation catalyst in the form of a tin-containing polymer.

Although the above silanol condensation catalysts, and in particular the tin carboxylates, are frequently used in the crosslinking of polymer compositions containing silanol groups, they are disadvantageous in some respects. Thus, efforts are being made to find silanol condensation catalysts reducing or obviating these disadvantages.

For instance, prior-art silanol condensation catalysts function satisfactorily only at elevated temperatures in the order of 80–100° C. and give a poor performance at normal ambient temperatures and relative humidities, such as room temperature (about 20–25° C.) and 50% RH. In many contexts, such as the production of cable insulations or water pipes, it is desirable that the silane-containing polymer composition can be crosslinked at room temperature without the use of water baths or steam cabinets. The degree of crosslinking of the polymer composition is measured as the gel content after crosslinking at a certain temperature for a certain period of time. It is desirable that crosslinking at room temperature for four days should result in a gel content of at least about 65% and a catalyst loading of about 1 mmole/kg composition. This is not achieved by existing silanol condensation catalysts, and it would therefore be a considerable step forward to provide a silanol condensation catalyst meeting this requirement.

SUMMARY OF THE INVENTION

The present invention relates to a new kind of silanol condensation catalyst reducing or obviating the drawbacks of prior-art catalysts in the crosslinking of polymer compositions containing polymers with hydrolysable silane groups. More precisely, the inventive silanol condensation catalyst consists of certain lipophilic alkyl benzene or naphthalene sulphonic acids, or precursors of such acids, which permit crosslinking of silane-containing polymer compositions at room temperature.

The invention thus provides a crosslinkable polymer composition containing a crosslinkable polymer with hydrolysable silane groups and at least one silanol condensation catalyst, said polymer composition being characterised in that the silanol condensation catalyst comprises a compound of formula I $$ArSO_3H \tag{I}$$

or a hydrolysable precursor thereof, Ar being a substituted aryl group, and the total compound containing 14–28 carbon atoms. Preferably, the aryl group is an alkyl-substituted benzene ring with the alkyl substituent containing 8–20 carbon atoms.

DETAILED DESCRIPTION OF THE INVENTION

Further characteristics and advantages of the invention appear from the appended claims and the following description.

The inventive silanol condensation catalyst is distinguished by being a benzene or naphthalene sulphonic acid that is sufficiently lipophilic to be compatible with the polymer composition to be crosslinked, e.g. polyethylene containing hydrolysable silane groups. To achieve such lipophilicity, the hydrocarbon group of the alkylaryl sulphonic acid must have a certain size and must, e.g. in the case where the acid is a benzene sulphonic acid, have an alkyl substituent containing at least 8 carbon atoms, as indicated in the foregoing. If the alkyl group does not have such a size that the lipophilicity requirement is met, the catalyst is not compatible with the polymer composition but will be released therefrom upon crosslinking in aqueous solution, thus impairing crosslinking efficiency.

In the inventive silanol condensation catalyst of formula I, Ar preferably is an alkyl-substituted aryl group containing a benzene or naphthalene ring, substituted by an alkyl group, the size of which is 8–20 carbon atoms in the benzene case and 4–18 carbon atoms in the naphthalene case. Due to commercial availability, it is most preferred that the aryl group is a benzene ring, substituted with an alkyl substituent containing 12 carbon atoms.

The currently most preferred compounds of formula I are dodecyl benzene sulphonic acid and tetrapropyl benzene sulphonic acid.

The inventive silanol condensation catalyst may also be a precursor of a compound of formula I, i.e. a compound that is converted by hydrolysis to a compound of formula I. Such a precursor is the acid anhydride of the sulphonic acid compound of formula I. Another instance is a sulphonic acid of formula I that has been provided with a hydrolysable protective group, e.g. an acetyl group, which can be removed by hydrolysis to give the sulphonic acid of formula I.

According to the invention, the amount of silanol condensation catalyst present in the crosslinkable polymer composition generally is in the order of about 0.0001–3% by weight, preferably about 0.001–2% by weight and most preferably about 0.005–1% by weight, as based on the amount of silanol-group containing polymers in the composition. It will be appreciated that the effective amount of catalyst depends on the molecular weight of the catalyst. Thus, a smaller amount is required of a catalyst having a low molecular weight, than of a catalyst having a high molecular weight.

The inventive catalyst is preferably added to the crosslinkable polymer in the form of a master batch, i.e. mixed with a polymer, such as a homo- or copolymer of ethylene, e.g. PE-LD or EBA containing 3–30% by weight of butyl acrylate. The master batch contains a minor amount of the catalyst, generally about 0.02–5% by weight, preferably about 0.05–2% by weight.

The inventive catalyst may be used in the crosslinkable polymer composition alone or combined with other silanol condensation catalysts, such as other catalysts of the formula I or conventional silanol condensation catalysts, e.g. carboxylic acid salts of the metals tin, zinc, iron, lead and cobalt; hydrolysis products of alkyl tin trichlorides; organic bases; inorganic acids; and organic acids.

The crosslinkable polymer composition according to the invention chiefly corresponds to prior art crosslinkable polymer compositions containing hydrolysable silane groups, but differs therefrom by containing the silanol condensation catalyst described above.

Thus, the invention generally concerns crosslinkable polymers containing hydrolysable silane groups, and more precisely it relates to olefin copolymers or graft polymers which contain hydrolysable silane groups and which are crosslinked under the influence of water and at least one silanol condensation catalyst. Specifically, the crosslinkable polymer is an ethylene homopolymer or copolymer containing crosslinkable silane groups introduced either by copolymerisation or graft polymerisation.

Preferably, the silane-containing polymer has been obtained by copolymerisation of an olefin, suitably ethylene, and an unsaturated silane compound represented by the formula

(II)

wherein $R_1$ is an ethylenically unsaturated hydrocarbyl, hydrocarbyloxy or (meth)acryloxy hydrocarbyl group, R' is an aliphatic saturated hydrocarbyl group, Y which may be same or different, is a hydrolysable organic group, and n is 0, 1 or 2.

If there is more than one Y group, these do not have to be identical.

Special examples of the unsaturated silane compound are those wherein $R_1$ is vinyl, allyl, isopropenyl, butenyl, cyclohexenyl or gamma-(meth)acryloxy propyl; Y is methoxy, ethoxy, formyloxy, acetoxy, propionyloxy or an alkyl- or arylamino group; and R', if present, is a methyl, ethyl, propyl, decyl or phenyl group.

A preferred unsaturated silane compound is represented by the formula $$CH_2=CHSi(OA)_3 \qquad (III)$$

wherein A is a hydrocarbyl group having 1–8 carbon atoms, preferably 1–4 carbon atoms.

The most preferred compounds are vinyl trimethoxysilane, vinyl bismethoxyethoxysilane, vinyl triethoxysilane, gamma-(meth) acryloxypropyltrimethoxysilane, gamma(meth) acryloxypropyltriethoxysilane, and vinyl triacetoxysilane.

The copolymerisation of the olefin (ethylene) and the unsaturated silane compound may be carried out under any suitable conditions resulting in the copolymerisation of the two monomers.

Moreover, the copolymerisation may be implemented in the presence of one or more other comonomers which can be copolymerised with the two monomers. Such comonomers include (a) vinyl carboxylate esters, such as vinyl acetate and vinyl pivalate, (b) alpha-olefins, such as propene, 1-butene, 1-hexene, 1-octene and 4-methyl-1-pentene, (c) (meth)acrylates, such as methyl(meth)acrylate, ethyl(meth) acrylate and butyl(meth)acrylate, (d) olefinically unsaturated carboxylic acids, such as (meth)acrylic acid, maleic acid and fumaric acid, (e) (meth)acrylic acid derivatives, such as (meth)acrylonitrile and (meth)acrylic amide, (f) vinyl ethers, such as vinyl methyl ether and vinyl phenyl ether, and (g) aromatic vinyl compounds, such as styrene and alpha-methyl styrene. Amongst these comonomers, vinyl esters of monocarboxylic acids having 1–4 carbon atoms, such as vinyl acetate, and (meth)acrylate of alcohols having 1-4 carbon atoms, such as methyl(meth)acrylate, are preferred. Especially preferred comonomers are butyl acrylate, ethyl acrylate and methyl acrylate. Two or more such olefinically unsaturated compounds may be used in combination. The term '(meth)acrylic acid' is intended to embrace both acrylic acid and methacrylic acid. The comonomer content of the copolymer may amount to 70% by weight of the copolymer, preferably about 0.5–35% by weight, most preferably about 1-30% by weight.

If using a graft polymer, this may have been produced e.g. by any of the two methods described in U.S. Pat. No. 3,646,155 and U.S. Pat. No. 4,117,195, respectively.

The silane-containing polymer according to the invention suitably contains 0.001–15% by weight of the silane compound, preferably 0.01–5% by weight, most preferably 0.1–3% by weight.

As is usually the case for polymer compositions, the crosslinkable polymer may contain various additives, such as miscible thermoplastics, stabilisers, lubricants, fillers, colouring agents and foaming agents.

As to the miscible thermoplastics added, mention may be made of miscible polyolefins, such as polyethylene of low density, medium density and high density, polypropylene, chlorinated polyethylene, as well as various copolymers including ethylene and one or more other comonomers, e.g. vinyl acetate, methyl acrylate, propene, butene, hexene and the like. One may use either a single polyolefin or a mixture of several polyolefins. The polyolefin content of the composition may be up to 70% by weight, as based on the total amount of this polyolefin and the silane-containing polymer.

As to fillers, mention may be made of inorganic fillers, such as silicates, e.g. kaolin, talc, montmorillonite, zeolite, mica, silica, calcium silicate, asbestos, powdered glass, glass fibre, calcium carbonate, gypsum, magnesium carbonate, magnesium hydroxide, aluminium hydroxide, carbon black and titanium oxide. The content of the inorganic filler may be up to 60% by weight, as based on the sum of the weights of the filler and the silane-containing polymer.

Finally, it should be observed that the crosslinkable polymer used in the invention is previously known and that the novel and distinctive feature of the invention thus does not reside in this polymer, but in the special silanol condensation catalyst added to the polymer to form the inventive polymer composition.

The following nonrestrictive Examples are incorporated herein to further illustrate the invention.

EXAMPLE 1

A silanol condensation catalyst was added to a crosslinkable polymer with hydrolysable silane groups. The polymer was a copolymer of ethylene and vinyl trimethoxysilane The amount of vinyl trimethoxysilane was 2% by weight. A crosslinkable composition was prepared by adding to the polymer a silanol condensation catalyst according to the invention. The catalyst was added in the form of a master batch of low-density polyethylene containing 8 mmole catalyst/kg master batch. The master batch was added in such quantities that the amount of catalyst in the total composition in each case became that given in Table 1 below. The composition was then crosslinked. The degree of crosslinking at different points of time was measured by decalin extraction according to the UNI 459 method, which is in accordance with ASTM D 2765, except that, after decalin extraction for 6 h, extraction is continued for 1 h in pure, boiling decalin. The results are given in Table 1 below, in which the values given are mean values of two determinations.

TABLE 1

Crosslinking temperature 23° C.; 50% relative humidity

| Catalyst | Amount mmole/kg | 2 days | 4 days | 7 days | 10 days | 15 days |
|---|---|---|---|---|---|---|
| Dodecyl-benzene sulphonic acid | 0.4 | | 70 | | | |
| (=Ufacid K) | 0.8 | 27 | 69 | 77 | 77 | |
| Tetrapropyl-benzene sulphonic acid | 0.4 | | 72 | | | |
| | 0.8 | 45 | 70 | 77 | 75 | 78 |
| | 1.6 | 52 | | | 78 | 79 |
| (=Ufacid TPB) | 2.3 | 64 | | | 80 | 80 |
| Acetyl p-dodecyl-benzene sulphonate | 0.8 | 74 | 76 | 79 | 79 | |

EXAMPLE 2

For comparative purposes, tests were performed under essentially the same conditions as in Example 1, using various compounds of conventional type or otherwise lying outside the invention as catalysts. The results are given in Table 2 below, in terms of gel content in % by weight:

TABLE 2

Crosslinking temperature 23° C.; 50% relative humidity

| Catalyst | Amount mmole/kg | 2 days | 4 days | 7 days | 10 days | 15 days |
|---|---|---|---|---|---|---|
| DBTDL | 0.79 | 55 | 46 | | 59 | |
| | 1.58 | 65 | 62 | | 72 | |
| | 2.34 | 68 | 65 | | 72 | |
| Sn(II)octoate | 0.79 | | 10 | 13 | | 19 |
| | 1.58 | | 60 | 53 | | 60 |
| | 2.34 | | 60 | 63 | | 59 |
| p-toluene sulphonic acid | 0.8 | | 66 | 68 | | 74 |
| | 4.5 | | 73 | 72 | | 78 |
| 1-naphthalene sulphonic acid | 0.8 | 68 | 74 | 75 | 77 | |
| 2-naphthalene sulphonic acid | 0.8 | 70 | 74 | 77 | 76 | |
| Acetyl methane sulphonate | 0.8 | 52 | 60 | 64 | 66 | |
| Acetyl p-toluene sulphonate | 0.8 | 73 | 75 | 79 | 78 | |

As is evident from Tables 1 and 2, the inventive catalysts provide more rapid crosslinking at room temperature than do the conventional catalysts DBTDL and Sn(II)octoate at corresponding contents. The likewise conventional toluene and naphthalene sulphonic acids, although providing rapid crosslinking, have the disadvantage of discolouring the polymer considerably. Neither can these acids be used for crosslinking in water baths, since they are then rapidly dissolved into the aqueous phase, which diminishes their catalytic activity. The same disadvantages arise also with the acetyl methane and toluene sulphonates tested.

EXAMPLE 3

The test according to Example 1 was repeated, using tetrapropyl benzene sulphonic acid (TPBSA) as catalyst. Crosslinking was performed at 40° C. in the presence of water and with different contents of the catalyst. For comparative purposes, corresponding tests were carried out using dibutyl tin dilaurate (DBTDL) and tin(II)octoate as catalysts. The results appear from Table 3 below.

TABLE 3

| Catalyst | Amount of catalyst (mmole/kg) | Crosslinking degree (%) at 40° C. after | | | | |
|---|---|---|---|---|---|---|
| | | 5 h | 16 h | 24 h | 48 h | 96 h |
| DBTDL 99 | 0.79 | 8 | 39 | 50 | 59 | 61 |
| Sn(II)octoate | 0.79 | 44 | 60 | 63 | 61 | 68 |
| TPBSA | 0.79 | 38 | 67 | 78 | 75 | |
| | 1.58 | 53 | 71 | 76 | 77 | |
| | 2.34 | 62 | 76 | 77 | 77 | |

As is evident from Table 3, the inventive catalyst provides more rapid crosslinking at 40° C than do the conventional catalysts at corresponding contents.

EXAMPLE 4

The test according to Example 3 was repeated, except that crosslinking was carried out at 60° C. The results appear from Table 4 below.

TABLE 4

| Catalyst | Amount of catalyst (mmole/kg) | Crosslinking degree (%) at 60° C. after | | | | |
|---|---|---|---|---|---|---|
| | | 2 h | 5 h | 7 h | 17 h | 20 h |
| DBTDL 99 | 0.79 | | 51 | 56 | | 64 |
| | 1.58 | | 62 | 63 | | 87 |
| | 2.34 | | 65 | 70 | | 86 |
| Sn(II)octoate | 0.79 | | 63 | 65 | | 72 |
| | 1.58 | | 74 | 75 | | 78 |
| | 2.34 | | 80 | 76 | | 79 |
| TPBSA | 0.79 | 56 | 75 | 76 | 78 | |
| | 1.58 | 64 | 77 | 79 | 79 | |
| | 2.34 | 73 | 78 | 78 | 79 | |

As is evident from Table 5, the inventive catalyst generally provides more rapid crosslinking at 60° C. than do the conventional catalysts at corresponding contents.

EXAMPLE 5

The test according to Example 3 was repeated, except that crosslinking was carried out at 80° C. The results appear from Table 5 below.

TABLE 5

| Catalyst | Amount of catalyst (mmole/kg) | Crosslinking degree (%) at 80° C. after | | | | |
|---|---|---|---|---|---|---|
| | | 1 h | 2 h | 4 h | 7 h | 20 h |
| DBTDL | 0.79 | | 53 | 57 | 67 | 75 |
| | 1.58 | | 63 | 66 | 88 | 79 |
| | 2.34 | | 68 | 76 | 89 | 79 |
| Sn(II)octoate | 0.79 | | 61 | 68 | 71 | 74 |
| | 1.58 | | 73 | 78 | 77 | 78 |
| | 2.34 | | 79 | 79 | 80 | 80 |
| TPBSA | 0.79 | 73 | 75 | 77 | 79 | |
| | 1.58 | 76 | 79 | 79 | 80 | |
| | 2.34 | 78 | 79 | 79 | 80 | |

As is evident from Table 5, the inventive catalyst generally provides more rapid crosslinking at 80° C. than do the conventional catalysts at corresponding contents, and especially at low contents.

EXAMPLE 6

The test according to Example 3 was repeated, except that crosslinking was carried out at 90° C., and that three catalysts according to the invention, as well as several catalysts falling outside the invention, were tested. The results appear from Table 6 below.

TABLE 6

| Catalyst | Amount mmole/kg | Crosslinking degree in % by weight after | | | | | | |
|---|---|---|---|---|---|---|---|---|
| | | 0.25 h | 1 h | 1.5 h | 2 h | 5 h | 20 h | 100 h |
| p-dodecyl benzene sulphonic acid | 0.8 | 64 | | 75 | | 79 | 81 | 81 |
| Tetrapropyl benzene sulphonic acid | 0.8 | 57 | 76 | 75 | 77 | 78 | 81 | 83 |
| | 1.6 | 61 | 79 | | 80 | | | |
| | 2.3 | 70 | 80 | | 80 | | | |
| Acetyl p-dodecyl benzene sulphonate | 0.8 | 73 | | 78 | | 78 | 81 | 82 |
| DBTDL | 0.8 | 23 | | 53 | | 75 | 79 | 79 |
| | 1.6 | | | 62 | | 76 | 80 | |
| | 2.3 | | | 77 | | 80 | 82 | |
| Sn(II)octoate | 0.8 | 57 | | 67 | | 70 | 71 | 75 |
| | 1.6 | | | 78 | | 79 | 77 | |
| | 2.3 | | | 78 | | 80 | 81 | |
| 1-naphthalene sulphonic acid | 0.8 | 38 | | 49 | | 43 | 57 | 66 |
| 2-naphthalene sulphonic acid | 0.8 | 35 | | 40 | | 54 | 62 | 69 |
| Acetyl methane sulphonate | 0.8 | 8 | | 5 | | 9 | 12 | 22 |
| Acetyl p-toluene sulphonate | 0.8 | 38 | | 48 | | 51 | 54 | 63 |

As is evident from Table 6, the inventive catalysts provide more rapid crosslinking in water at 90° C than do the conventional catalysts DBTDL and Sn(II)octoate at corresponding contents. It is also apparent that the non-compatible naphthalene sulphonic acids as well as the acetyl derivatives of the very water-soluble methane and toluene sulphonic acids, which all work fairly well at 23° C. and 50% relative humidity, at 90° C. in water are dissolved out of the plastic compounds and thus become comparatively much less active as catalysts.

EXAMPLE 7

A number of crosslinking tests were carried out involving inventive silanol condensation catalysts, as well as reference catalysts falling outside the scope of the invention. The tests were performed in accordance with Example 1, and the catalyst content was 0.8 mmole/kg polymer composition, unless otherwise stated. The tests were performed at the temperatures and for the times indicated in Table 8. Of the tested catalyst compounds 1–13 in Table 8, 1–3 are inventive catalysts and 4–13 are reference catalysts. The inventive compound 3 (acetyl p-dodecyl benzene sulphonate) is a precursor compound which, after hydrolysis, gives p-dodecyl benzene sulphonic acid. From the results given in Table 7, it is evident that the inventive catalysts give faster crosslinking than conventional catalysts 4 and 5, especially at room temperature, but also at elevated temperatures. Some of the other compounds, such as compounds 6 and 7, apparently give good results at room temperature, but discolour the polymer considerably, especially at higher temperatures. Neither can they be used for crosslinking in water baths, since they are then dissolved from the polymer, something which also applies to the hydrolysis products of compound 9 and especially compounds 8 and 10. Further, after hydrolysis, compound 9 of course gives the same discolouration as compound 7. Compounds 11 and 12 give good results at 23° C., but are extracted from the polymer at temperatures higher than 60° C. It may also be observed that compound 13, i.e. the sodium salt of compound 1 according to the invention, does not act as a silanol condensation catalyst.

TABLE 7

| Compound | Crosslinking degree (%) | | | |
|---|---|---|---|---|
| | 90° C. 1.5 h | 80° C. 4 h | 60° C. 17 h | 23° C., 50% R.H. 5 days |
| 1. Dodecyl benzene sulphonic acid | 75 | 78 | 79 | 73 75 (8 days) |
| 2. Tetrapropyl benzene sulphonic acid | 75 | 77 | 78 | 72 76 (8 days) |
| 3 Acetyl-p-dodecyl benzene sulphonate | 78 | 77 | 76 | 77 |
| 4. DBTL | 53 | 57 | 58 | 55 (4 days) |
| 5. Sn(II)octanoate | 64 | 57 | 65 | 36 (4 days) |
| 6. Sulphuric acid | 39 | 35 | 48 | 71 |
| 7. p-toluene sulphonic acid (0.8 and 4.5 mmole/kg, respectively) | 27 | | | 66 (4 days) 73 (4 days) |
| 8. Acetyl methane sulphonate | 5 | 5 | 35 | 62 |
| 9. Acetyl p-toluene sulphonate | 48 | 53 | 65 | 78 |
| 10. Octadecanoyl methane sulphonate | 22 | 23 | 39 | 53 |
| 11. 1-naphthalene sulphonic acid | 49 | 49 | 65 | 73 |
| 12. 2-naphthalene sulphonic acid | 40 | 53 | 67 | 75 |
| 13. Dodecyl benzene sulphonic sodium salt[1] | 1.7 | 0 | 2.3 | 0 |

[1]compounded on twin-screw extruder

We claim:

1. A crosslinkable polymer composition containing a crosslinkable olefin polymer which contains 0.001–15% by weight of a silane compound with hydrolysable silane groups and which is crosslinkable under the influence of water and at least one silanol condensation catalyst, wherein the silanol condensation catalyst comprises a compound of formula I $$ArSO_3H \qquad (I)$$

or a precursor thereof, Ar being a benzene ring substituted with at least one hydrocarbyl radical such that the total number of carbon atoms of the hydrocarbyl radical(s) is 8–20, or a naphthalene ring substituted with at least one hydrocarbyl radical such that the total number of carbon atoms of the hydrocarbyl radical(s) is 4–18, and the compound of formula I containing 14–28 carbon atoms in total.

2. A polymer composition as set forth in claim 1, characterised in that the hydrocarbyl radical is an alkyl substituent having 10–18 carbon atoms.

3. A polymer composition as set forth in claim 2, characterised in that the alkyl substituent contains 12 carbon atoms and is selected from dodecyl and tetrapropyl.

4. A polymer composition as set forth in claim 1, characterised in that the silanol condensation catalyst is a precursor of the compound of formula I.

5. A polymer composition as set forth in claim 4, characterised in that the precursor is an anhydride of the sulphonic acid of formula I.

6. A polymer composition as set forth in claim 4, characterised in that the precursor is a sulphonic acid of formula I provided with a hydrolysable protective group.

7. A polymer composition as set forth in claim 6, characterised in that the hydrolysable protective group is acetyl.

8. A polymer composition as set forth in claim 7, characterised in that the precursor is acetyl p-dodecyl benzene sulphonate.

9. A polymer composition as set forth in claim 1, characterised in that it contains 0.1–3% by weight of silanol condensation catalyst.

10. A polymer composition as set forth in claim 1, characterised in that it further contains another silanol condensation catalyst.

* * * * *